Jan. 10, 1956  A. C. PETERSON  2,730,184
VEHICLE PROPULSION AND TRANSMISSION MEANS
Filed Feb. 14, 1952  4 Sheets-Sheet 4

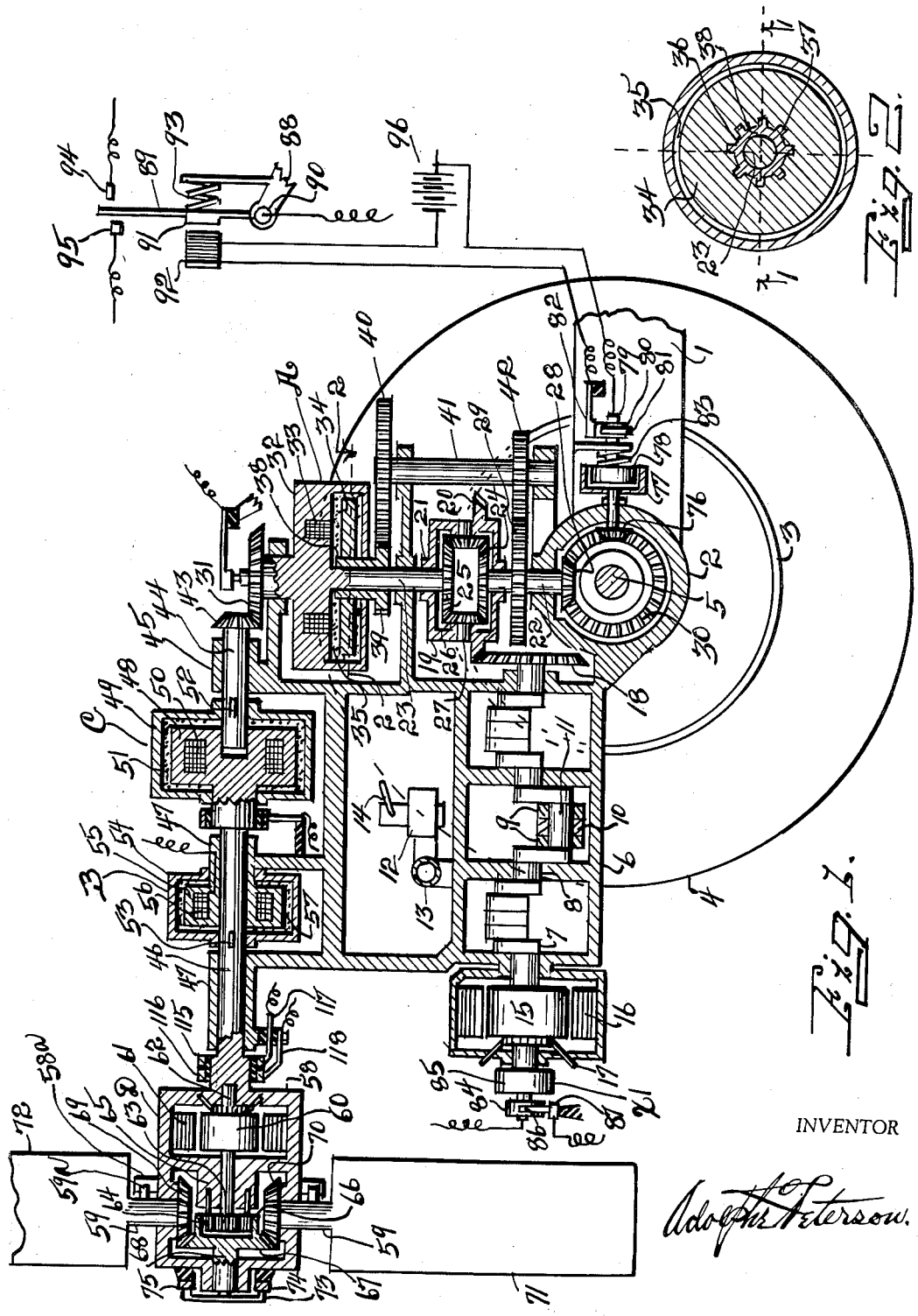

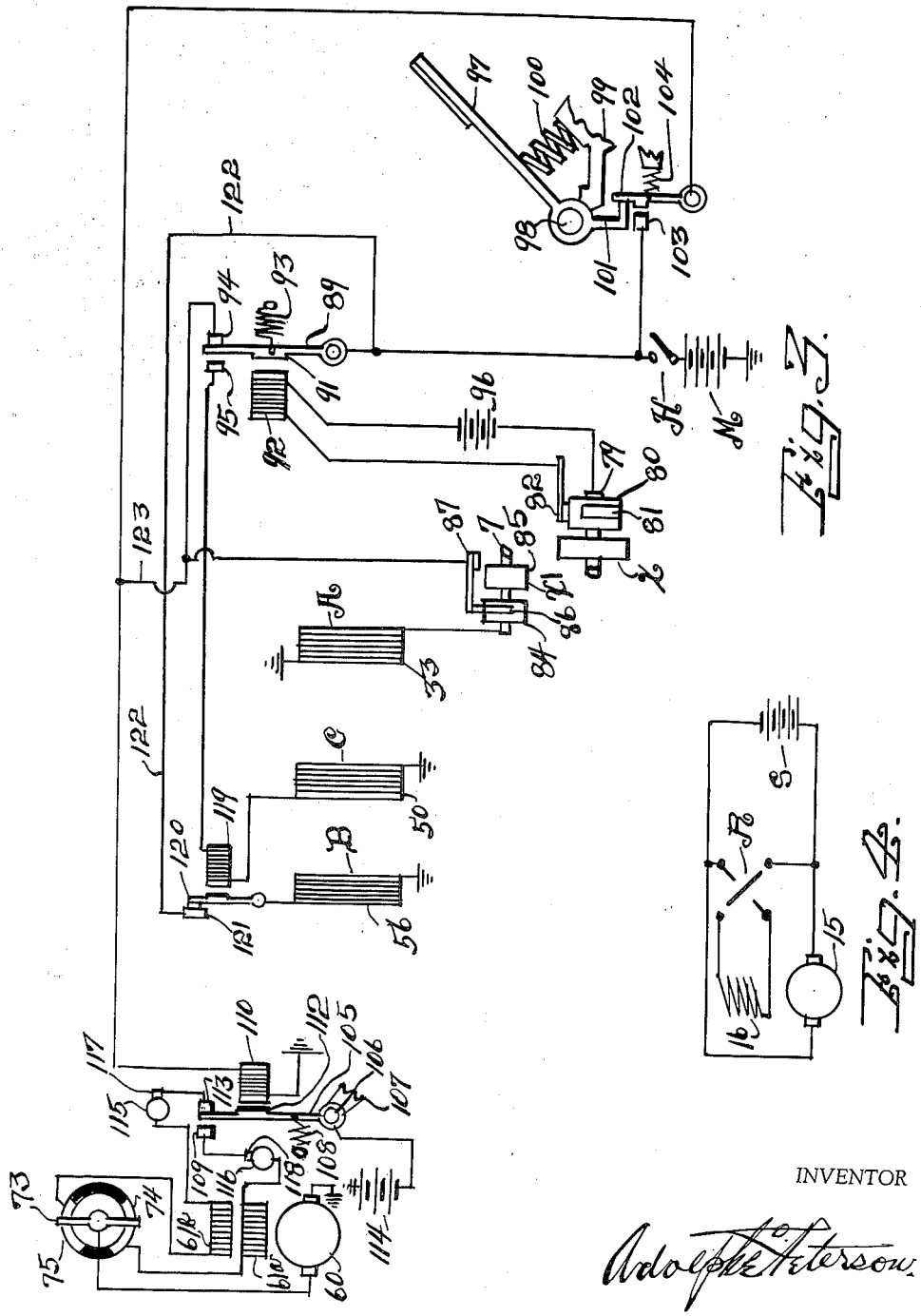

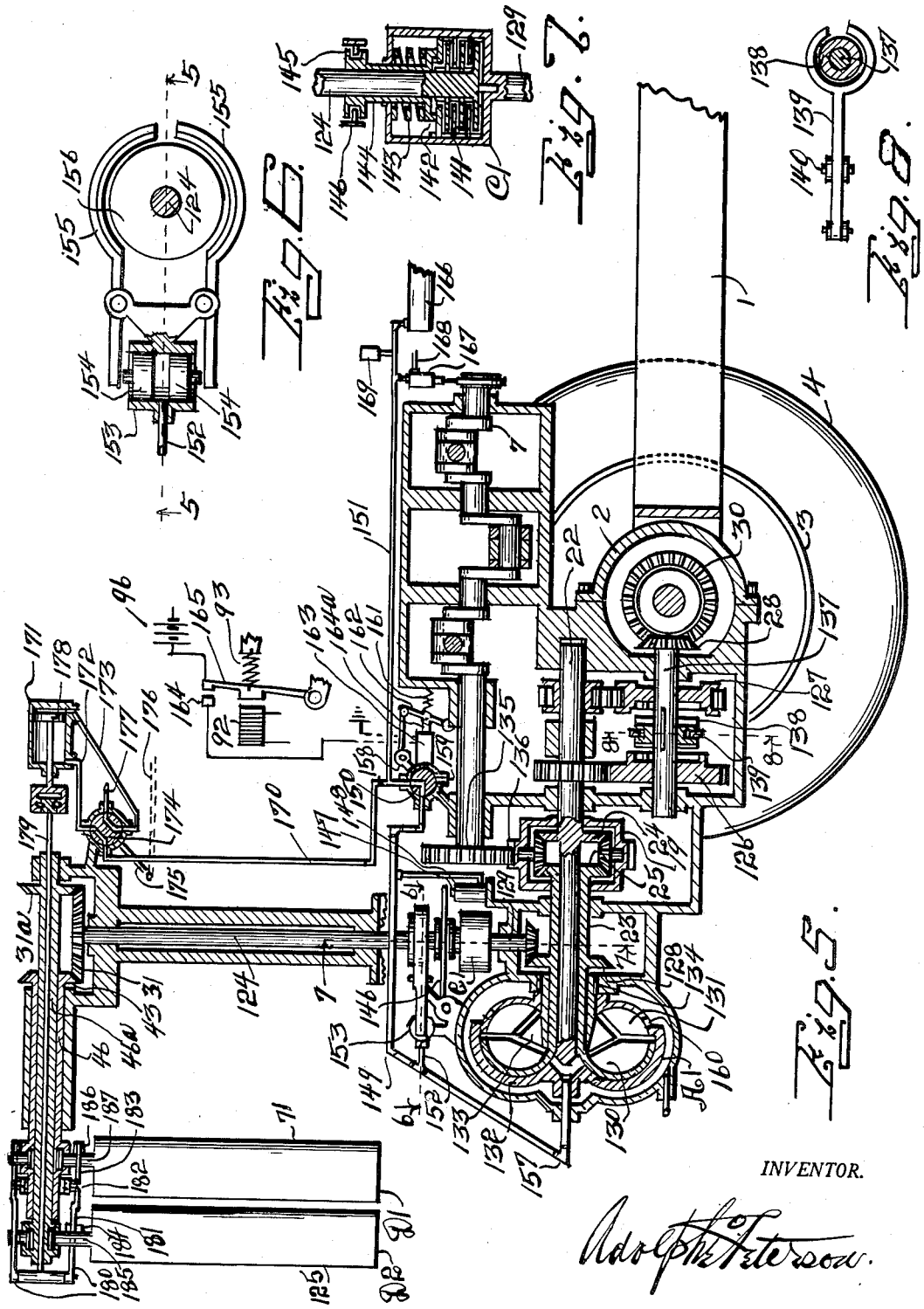

INVENTOR
Adolphe C. Peterson.

United States Patent Office 2,730,184
Patented Jan. 10, 1956

2,730,184

VEHICLE PROPULSION AND TRANSMISSION MEANS

Adolphe C. Peterson, Edina, Minn.

Application February 14, 1952, Serial No. 271,457

16 Claims. (Cl. 180—54)

My invention relates to means for effecting variable transmission and also propulsion and is therefore called—Vehicle Propulsion and Transmission Means.

The principal object of my invention is to provide an improved form of the means which is described and claimed in the patent which was issued to me under date of May 29, 1951, and which is identified as Patent Number 2,554,590, Combined Air Propeller and Wheel Drive for Effecting Vehicle Propulsion.

The chief objects of this improvement upon that device as described in the patent identified, is to improve the qualities of such a device for general use in automobile vehicles, particularly such automobiles as may be used generally by more or less skilled persons; to provide such a device in a form which has in conjunction with it provision for other means of transmission at very slow speed and in conditions unsuited for the especial form of propulsion shown in the patent indicated so that the device thereof may be available for use when desired and may be utilized for all driving or traveling at speeds over that appropriate for involved traffic conditions; to provide a control means for such variable driving propulsion and variable conditions, which is automatic in form and imposes no additional strain on the driver of the vehicle; to improve the effectiveness of the device of the patent designated when used in braking of a vehicle and in descent of long hills where effective and continued braking of the vehicle without undue wear is desired; to utilize in combination a form of clutching or engagement means which provides easy and quick control for the elements of the device; and in general to provide an improvement of said device so that the device may be available for various types of vehicle and general uses in more adaptable form and to provide the improved means with adequate control means so that the device may be utilized more freely in all conditions of traffic and in more general conditions of traffic.

The particular devices and combinations of devices comprising my invention, are as hereinafter described and as more particularly claimed in the claims. In the accompanying drawings, illustrating my invention in several different forms, like characters refer to like parts throughout the views in so far as practicable. Referring to the drawings:

Figure 1 is a view of a preferred form of my invention, this view being a vertical section through the axis of the crank shaft of an engine provided with my device, through a plane longitudinally of the rear end of a vehicle chassis embodying my invention, some parts being in full side elevation, some parts being broken away (notably the entire front end of the chassis) the section being on the line 1—1 of Fig. 2.

Figure 2 is a detail horizontal section through parts of one clutching means, on the line 2—2 of Figure 1.

Figure 3 is a diagrammatic sketch showing the various control elements in relation to the various coils and other elements for effecting automatic control under the manual control of a driver of a vehicle, and is the control to accompany the form of device shown in Figure 1.

Figure 4 is a diagrammatic illustration of the reversing control of the starting motor used with the engine of the means.

Figure 9:
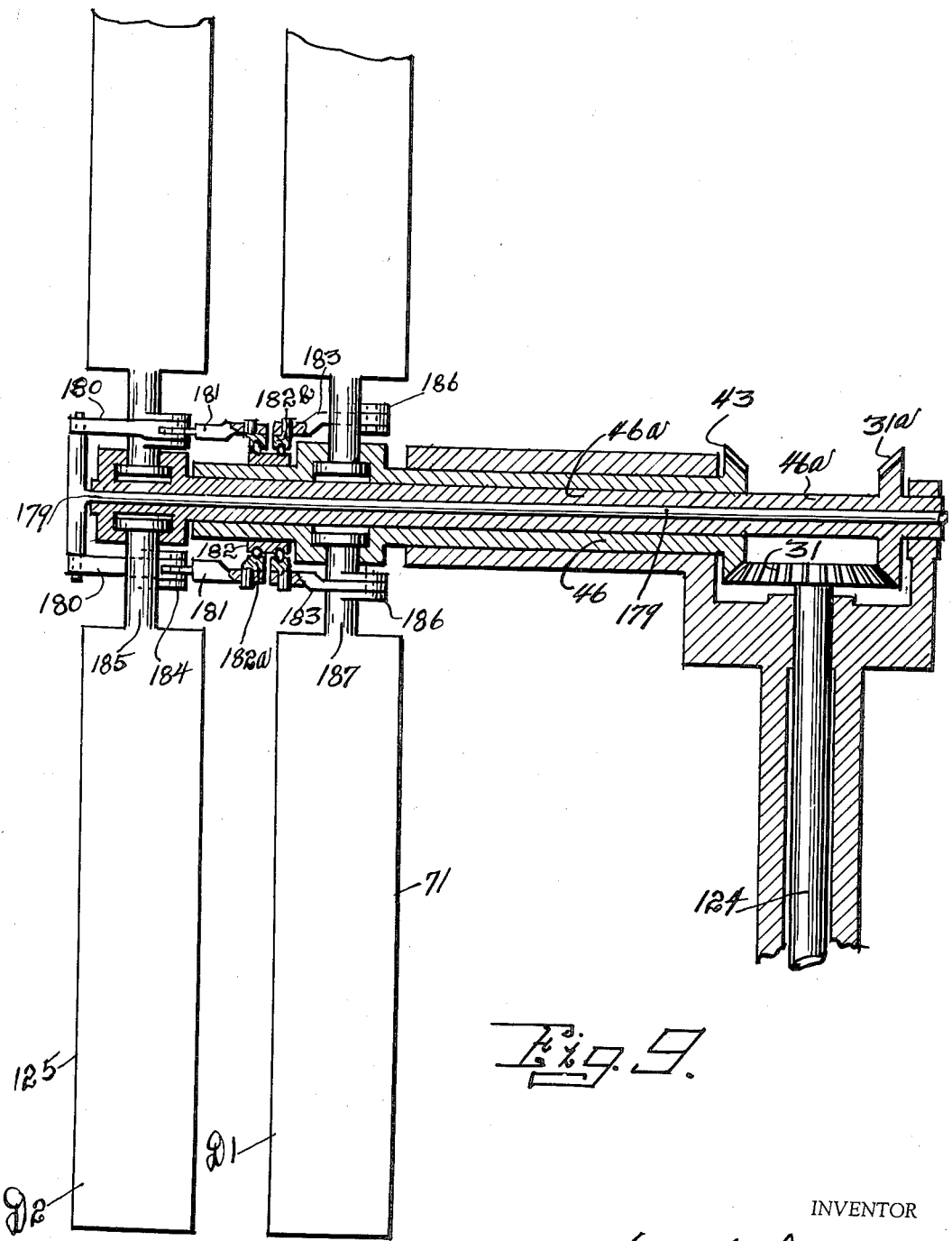

Figures 5, 6, 7, and 8 are figures illustrating a modified form. Figure 5 is a vertical section through a vertical plane similar to the plane of Figure 1, longitudinally through the rear end of a vehicle chassis, some parts being shown in full side elevation, some parts broken away (notably the front end of the chassis), this section being on the line 5—5 of Figure 6.

Figure 6 is a detail view partly in section on the line 6—6 of Figure 5, chiefly in plan view to illustrate the propeller braking means.

Figure 7 is a detail view in section on the line 7—7 of Figure 5, illustrating the section of the propeller clutching means.

Figure 8 is a detail view partly in section on line 8—8 of Figure 5, chiefly in side elevation looking from the left of Figure 5.

Figure 9 is an enlarged view in section similar to that of Figure 5 to show the contra-rotating propeller means D1 and D2, its blade incidence control means and propeller drive gears, the engine means being not shown.

Referring first to Figures 1, 2, 3, 4, which illustrate the one form of my device, one of the chassis side rails designated 1 is shown, the other at the other side of the vehicle being not shown, a fixed rear axle casing 2 is mounted rigidly or flexibly on the chassis side rails 1 by any means, not shown. Any flexible or spring mounting means for the vehicle chassis, such as used in the illustrating in the Patent Number 2,554,590, (Fig. 2 thereof), may be used or any other type, for mounting of the vehicle chassis 1 on rear wheels 3, one only being shown, the other being not shown. The rear wheels may have pneumatic tires 4, one only being shown, the other not being shown. The rear axle casing has mounted in bearings (not shown) in it, to rotate on an axis transversely of the chassis 1, the rear wheel drive axle 5, this driving the rear wheels 3—4 in any manner, or as in the patent designated above. The rear axle and rear end of the chassis 1 has mounted on it the engine crank casing 6, this diagrammatically illustrating the engine used with the device, there being a crank shaft 7 mounted in bearings 8 therein, and connecting rods 9 and 10 on each crank pin 11 (one connecting rod being a bifurcated one at its wrist end), the connecting rods being operated by the usual pistons in cylinders as in any horizontal opposed type of internal combustion engine, the pistons and cylinders not being shown. The engine may have a carburetor 12 supplying its cylinders, the carburetor supplying a manifold 13 and being controlled by any type of throttle means by manual control lever 14, it being noted that any type of engine and fuel supply and engine control means for manual control thereof may be used. The engine crank shaft 7 may have a motor armature 15 fixed thereon or driving to it by any type of reduction means, for starting of the crank shaft 7 in either direction, forward or reverse, and the armature 15 operates within field magnets 16 and current is supplied to the armature by brush means 17. A reverse control for the motor 15—16 is shown in Fig. 4, so that the crank shaft may be started in any direction for forward or reverse driving.

The engine crank shaft 7 at its front end has fixed thereon the bevel gear 18 which drives in permanent engagement a differential casing 19 upon the exterior of which is fixed bevel gear 20. The differential casing 19 has mounted axially therein in bearings 21 the differential drive shafts 22 and 23, respectively, which have the drive gears 24, 25, respectively fixed thereon, and the differential drive gears 24, 25 are differentially driven through the smaller balancing bevel gears 26, the shafts 27 of the latter being rotatably mounted in the differential casing 19, to rotate on axes at right angles to the axes of differential drive gears 24, 25, each bevel gear 26 being engaged on opposite sides by one of the differential drive gears 24, 25, respectively. The bevel gear 18 on the engine shaft thus drives differentially, according to load conditions, to the differential drive shafts 22 and 23.

The lower drive shaft 22 has small bevel gear 28 fixed on its lower end and has intermediately fixed on it the large spur gear 29. The bevel gear 28 drives larger bevel gear 30 which is fixed either directly or indirectly (by any differential means as commonly used) to rear wheel drive axle 5 to drive it, all driving for normal travel being, at normal travel speeds, through the bevel gears 28, 30 to axle 5.

The upper drive shaft 23 has fixed on its extreme upper end the bevel gear 31, which will drive to a propeller means as hereinafter described, and has intermediately of it, fixed to it, an activating magnetic field or magnet of electro-magnetic kind, designated 32, this having formed therein the electro-magnetic coil 33 for electrical excitation, as hereafter described. This electro-magnetic means 32—33 is a part of a magnetic friction clutch of the type recently discovered and publicized by the Bureau of Standards, U. S. A., and includes an axially movable armature 34 and an oil bearing iron filings or grains designated as 35, which will become electro-magnetically excited or magnetized and thereby clutched frictionally. The axially movable armature 34 has internal gear teeth 36 slidable on external gear teeth 37 on sleeve shaft 38 (Fig. 2 and Fig. 1) so that armature 34 may be drawn electro-magnetically towards electro-magnet 32 the iron filing mixture in between being also simultaneously magnetized, this being in accordance with one type of the electro-magnetic clutch designated.

The sleeve shaft 38 has fixed on its lower end the small spur gear 39, and when the clutch means 32, 33, 34, 35 is excited torque will be thereby transmitted by shaft 23 to small spur gear 39 and thereby to large spur gear 40 with which it is in permanent engagement. The spur gear 40 is fixed on secondary shaft 41 and the latter has fixed on it small spur gear 42 which is in permanent engagement with large spur gear 29, so thereby when the clutch designated is excited transmission of torque from shaft 23 is through the clutch to sleeve shaft 38 and at much reduced speed by way of gears 39, 40, 42, 29 to shaft 22 and thereby to bevel gear 28 and bevel gear 30 to drive axle 5. This is the drive for low travel speed and starting as hereinafter described, and at such travel speed the propeller drive is not engaged. The secondary transmission as just described may be otherwise engaged for braking condition, as hereafter described.

The bevel gear 31 is in permanent engagement with smaller bevel gear 43 and thereby with short shaft 44 which is mounted in bearing means 45 to rotate on a horizontal axis centrally and longitudinally of the vehicle chassis, and is in alignment axially with a propeller drive shaft 46 which is mounted to rotate in bearings 47. There is an electro-magnetic clutch means of similar type to that above described, and designated field or electromagnet 48, armature casing 49, coil 50, electromagnetically excitable iron filings mixture 51. The armature casing 49 is keyed to short shaft 44 by keys 52 so casing 49 rotates with shaft 44 and bevel gear 43 to transmit torque to propeller shaft 46 when the iron filing mixture 51 is electro-magnetically excited, and this torque connection is broken when the iron filings mixture 51 is not so excited. While this clutch means is of the same general type as the first clutch described in that it utilizes the electro-magnetized iron filings mixture principle, it does not have the movable armature type as does the first clutch described. Either type may be used in either position or use and any other type of electro-magnetically excited or induced clutching means may be used instead, such as the eddy current type of clutching means. The first clutch above described, that between shaft 23 and sleeve shaft 38 is designated the A clutch, and the second, that between the short shaft 44 and the propeller drive shaft 46 is designated the C clutch.

The propeller drive shaft 46 has fixed to it by keys 53 an armature casing 54 and with the latter there is a field magnet or electro-magnet 55, cylindrical in form, having a coil 56, and there is the iron filings mixture 51 between the magnet 55 and casing 54, for excitation, in the same manner as described regarding clutch C, but in this case the means is a braking means as the electro-magnet 55 is fixed to bearing 47 rightwardly of the brake means. This brake means is generally designated Brake means B, and serves to quickly bring the propeller drive shaft 46 and its propeller to a stop, as hereafter described.

The propeller drive shaft 46 at its rearward end has fixed thereon the propeller hub casing 58 and the latter has mounted therein in bearings to be oscillable on axes at right angles to the axis of drive shaft 46, the propeller blade or air foil shafts 59 of which there may be two or more, two being shown, placed at diametrically opposite sides of the hub casing 58. The propeller unit is generally designated D.

Internally of the hub casing 58 there is rotatably mounted an armature 60 rotatable between field magnets or coils 61 and fixed on and to rotate shaft 62 which has fixed on it small spur gear 63 which through small spur gears 64 mounted on shafts in bearing 65 drives an internal gear 66 in a drum fixed on one side of a bevel gear 67, and the latter is oscillable on shaft 68 which is mounted in hub casing 58 on an axis in alignment with drive shaft 46. The bevel gear 67 is in permanent engagement with bevel gears 69, 70, each of which is fixed on one of the blade shafts 59 at its inner end and by it the blade shaft may be oscillated to oscillate the attached blades or air foils 71 and 72 into the forward driving or reverse driving positions, as hereafter described. The shaft 68 has on its extreme rear end, fixed thereto a small contact member 73 fixed at right angles thereto and this contact member 73 is adapted to contact contacts 74, 75 fixed on the adjacent end of the hub casing, insulated therefrom but in circuit as hereafter described, so that contact member 73 moves according to oscillation of propeller blades 71, 72 on contacts 74, 75.

The bevel gear 30 of the drive axle 5 drives a small speedometer gear 76 which through magnetic speedometer means 77, 78, may affect the speed metering armature 78, according to speed, as such magnetic speedometers usually operate, and this speed measurement is transmitted to the shaft 79 whereon is the contact member 80 bearing contact 81 which is, as induced by vehicle travel speed exceeding a predetermined travel speed, in contact with spring contact 82 to transmit current. Coil spring 83 resists the magnetic torque on the magnetic armature 78.

The engine crank shaft 7 bears on its extreme rear end between it and contact member 84 another electro-magnetic speed measuring means generally designated as 85 which is similar to that shown as 77, 78, or may be any other type of speed measuring means to measure the speed of crank shaft 7 by means of contact member 84 which bears contact 86 and moves according to speed measurement in relation to contact 87, to contact the latter by contact 86, when a predetermined speed over idling speed is attained by engine crank shaft 7.

There is mounted anywhere in the vehicle chassis on a bracket 88, a contact lever 89 swinging on pivot 90, having armature 91 which may be attracted by a magnet 92, but is normally retracted by tension spring 93 and contacts contact 94 in retracted position and contact 95 when armature 91 is attracted by magnet 92 which is an electro-magnet. The electro-magnet 92 is magnetized when current is passed thereto from battery 96 by means of contacts 81—82.

The chassis will also have mounted on it in its forward part (not shown), the customary brake pedal for braking the vehicle, that is applying the usual vehicle brakes, these not being shown, and that brake pedal 97 (Fig. 3 only) will be pivoted on pivot 98 on bracket 99 and be normally elevated by any spring means 100 which may be such as usual in vehicle braking means, and when so elevated that brake pedal by means of lever 101, will then contact pivoted contact 102, then pushes it away from contact 103 to break contact and its circuit. Except when so moved away from contact, the lighter spring 104, a compression spring, moves contact 102 to make contact with contact 103 and thereby completes the circuit through contact 102—103, which therefore will be whenever the brake pedal is first manually depressed by the driver.

Figure 3 shows the circuits, except that of the reversible starting motor for the crank shaft 7, and there is in Figure 3 shown alternative coils 61a and 61b of field magnet 61 of the incidence angle changing motor in hub casing 58, whereby according to which of these is included in circuit, the propeller blades may be moved to forward or reversing condition. In Fig. 3 is also shown the control for the incidence control motor 60—61, and this includes a contact lever 105 pivoted at 106 on a bracket 107 mounted anywhere in the chassis, and normally pulled by tension spring 108 into contact with contact 109, the forward control contact, and for reversing of the propeller pulled by electro-magnet 110 acting on armature 112 to break contact with contact 109 and make contact with contact 113, the reversing contact, for braking use, chiefly. Either of contacts 109 and 113 is includable, as described with its field coil 61a or 61b in the circuit with armature 60 and battery 114, but each such circuit is also subject to control of the contacts 74 and 75, one of which is in circuit with one coil 61a and the other with coil 61b. The circuits are made through a pair of insulated contacts 115, and 116, which are mounted by insulation on the propeller drive shaft 46 adjacent hub casing 58, and complete circuits through spring contacts 117 and 118, respectively. Lugs 59a on shafts 59 may abut stops 58a to limit movement.

The electrical control circuits are further described in connection with the explanation of the use and operation of the means, and this is now explained chiefly in connection with Figures 1 and 3. While separate batteries are shown, it is contemplated that one battery may be used, but several circuits are shown through different batteries, for simplicity in description and explanation. It should be understood, first, that the means chiefly shown in Fig. 1, is mounted on the rear end of the chassis of the vehicle and that the propeller means, generally denoted D, is at the extreme rear or near that rear, and that the propeller blades are normally held in the position for forward propulsion of the vehicle chassis.

The engine crank shaft 7 is started for forward travel (or reverse travel) according to the setting of a reversing switch R, Fig. 4, and that if the driver wishes to travel forwardly he sets this switch and momentarily closes the circuit from a starting battery S to start crank shaft 7 for forward propulsion. In starting, hand switch H is open so transmission is not effective. Having started the engine crank shaft he controls the engine by means of carburetor throttle lever 14 or any other means, and then closes hand switch H, to permit current to flow from battery M. It is assumed that the vehicle stands still, and the engine idles. In idling condition the engine speedometer means 85 causes contacts 86—87 to break circuit from battery M through contact 94 and clutch A coil 33, so that there is no engagement of clutch A. But if now the driver causes engine speed to increase, the engine speedometer 85 causes contacts 86—87 to close as soon as engine idling speed has been exceeded and may be at say 300 to 350 revolutions per minute of shaft 7. When contacts 86—87 close, current flows from battery M through switch H, contact lever 89 low speed contact 94 through contacts 86—87 to clutch A (33), but does not flow through C clutch (50), and in this condition electro-magnet 119 is demagnetized and contact 120 contacts 121 to cause current by shunt 122 to flow through braking clutch B (coil 56), so propeller D is braked and inactive. But in this condition, clutch A activated and clutch C inactivated, spur gears 39 and 40, 42, 29 are engaged to shaft 23 so engine drives partly through shaft 22 and partly through shaft 23, as balanced by differential unit 19, 24, 25, and shaft 23 operates at much higher speed and passes torque through spur gears 39 and 40 and spur gears 42 and 29, to shaft 22 to assist in driving bevel gear 30 and axle 5. In this condition the engine shaft 7 operates faster than shaft 22 but not as fast as shaft 23 and reduction of speed from shaft 23 to shaft 22 through the spur gears is so great that the net reduction from crank shaft 7 to bevel gear 30 and axle 5 is as much or more than usual for lowest speed drives, and may be as much as fifteen or twenty to one.

As soon as the vehicle road speed reaches say ten to fifteen miles per hour, depending on the setting of speedometer X, the contacts 81 and 82 are closed and current then passes from battery 96 through electro-magnet 92 so that contact lever 89 is pulled to break contact with low speed contact 94 and make contact with contact 95, the high speed or normal travel contact. Current through clutch A is now broken and current flows through contact 95 to electro-magnet 119 to open the circuit of brake coil B and close the circuit of clutch C, whereupon the propeller D is released from the braking clutch B and drive is transmitted from bevel gear 31 through bevel gear 43 to short shaft 44 and clutch C to propeller shaft 46 and hub casing 58 and blades 71—72 are driven for forward propulsion, the current circuit through electro-magnet 110 now being broken so propeller blades are in the condition of forward drive incidence. Activation of electro-magnet 110 in low speed is without effect.

Assume now the driver desires cessation of propulsion and braking of the vehicle, he then depresses brake pedal 97, whereupon contacts 102—103 are closed, and current flows to electro-magnet 110 to draw contact lever 112 away from 109 and into contact with 113, to send current through reversing coil 61b of motor 60—61, so that this motor actuates bevel gear 67 to change the incidence of blades 71—72, and the motor 60—61 operates until contact means 73, 74, 75 breaks this contact, which is when change of incidence has been completed. Propeller D now, while rotating in the same direction, has backward propulsion. In this braking condition, however, current will flow through shunt 123 through contacts 86—87 and clutch A since the forward travel of the vehicle will cause the crank shaft 7 to be propelled until speed is diminished. Thus the driver by depressing brake pedal 97 not only will first close contacts 112—113 to cause propeller D to thrust backwardly upon the vehicle chassis but he may also by further depression of the brake pedal, as customary cause the usual friction brakes of the vehicle to engage, the latter not being shown. The propeller D is then effective as long as there is forward travel of the vehicle, to propel the vehicle, i. e. provide thust in the rearward direction, thus braking the vehicle. This propeller braking may be effective for down hill descent without engaging the usual friction brakes of the vehicle and may also be effective with those brakes. The braking by propeller D will continue until the speed is so low that speedometers X or X1 are effective to break contacts whereupon clutch C is inactivated, brake B engaged or activated, and clutch A continued in activation. Drive from crank shaft 7 will cease as soon as crank shaft 7 reaches idling speed whereupon contacts 86—87 break contact and clutch A is inactivated, so vehicle is or may be braked to a stop and engine shaft 7 may still operate, at idling speed.

For backward propulsion of the vehicle, the engine may be brought to rest and by switch R the direction of drive of shaft 7 reversed. But for reverse propulsion, the speedometer X holds the transmission in the low speed drive, as speed backwardly is never more than very low.

It will be noted that the control by speedometer X is such that propeller D always is engaged and clutch A disengaged (except for braking condition) when the vehicle has reached a speed of say ten miles per hour, or as predetermined fifteen miles per hour. This speed critical point would be determined as that speed where there is no probability that pedestrians will walk or run into the propeller D and ten to fifteen miles per hour is thought to be about that speed. It may be even less, say eight miles per hour, or may be made twenty miles per hour. In any event, at this critical speed of the vehicle, the change is determined, and above that speed the propeller drive is effective, and below ineffective. Above that speed, all acceleration may be accomplished by manipulation of engine throttle 14 to cause propeller D to increase in speed so the engine delivers great power and work and propels porportionately more by propeller D until the speed of axle 5 and wheels 3—4 is increased to desired speed, and at such speed (as controlled by the throttle), the drive will be balanced through differential 19, 22, 23, and gears 24, 25 and propulsion will be about evenly divided between propeller D and wheels 3—4. The division of the work load between the driving wheels (3—4), one at each side of the rear of the vehicle, and the propeller D is determined in any particular construction, in part by the proportions of the propeller blades 71—72, in part by the power of the engine, and in part by the speed of the transmission by the gears 31—43 to propeller D and by the other gears 28—30 to the road wheel means. The gears 31—43 may transmit the drive to propeller D at a relatively high speed so that a considerable work load may be taken by the propeller D at high speed of the propeller D.

Referring now to the modified form shown in Figures 5, 6, 7, 8, this form functions in a general way as the form first shown functions, and the device in this form automatically changes, from the low speed drive through the transmission means only to the road wheels, and then to the differential transmission of power between the propeller means by air propulsion and the road wheel drive propulsion, as in the first form. The low speed transmission is accomplished by a different means, namely one which is inclusive of a hydraulic converter drive. The automatic changing and clutching is accomplished by hydraulic means rather than by electric means as in the first form. And this modified form also shows the use of two contra-rotating air propellers, in the device.

In this form, the differential casing 19, gears 24, 25 of the differential drive to the differential shafts 22 and 23, as in the first form. Shaft 2 drives to bevel gears 28—30 to road wheel means 3—4. Shaft 23 drives through clutch C1 and shaft 124 to bevel gears 31—43 which drive the propeller means D1 and another bevel gear 31a which drives the propeller means D2, there being two propeller means each having its own set of propeller blades, one blade 71 of one set being shown and one blade 125 of the other set being shown. The bevel gear 31 drives to propeller shaft 46 to propeller means D1 and the bevel gear 31a drives through propeller shaft 46a to the other propeller means D2. One propeller shaft is tubular and the other axially within it.

The shaft 22 is in this case extended in two directions one end driving bevel gear 28 either through forward drive gears set 126, or reverse driving sprockets and chain means 127, and the other end is extended through the shaft 23 which is tubular. The tubular shaft 23 drives by bevel gear set 128 to the vertical shaft 129 which drives through clutch C1 to shaft 124. The extreme rearward end of tubular shaft 23 has fixed to it the impeller pump 130 of clutch A1. The extreme rearward end of rearwardly extended end of shaft 22 has attached to it the clutch casing 132 and thereby also has attached rotatively with it the turbine 131 of clutch A1. Within the clutch casing 132 there is as in converter fluid means the stator vane member 133 as in converter fluid means the stator vane member 133 being held against rotation in one direction by one-way roller clutch means 134. The means 130, 131, 133 is the well known hydraulic converter drive means and may be any type of such means. The engine crank shaft 7 in this form drives by spur gears 135, 136 to casing 19. Either forward or reverse drive gears 126 or 127, may be clutched to shaft 137 on which bevel gear 28 is fixed, by double-ended dog-clutch means 138 moved axially of shaft 137 by manually operated lever means 139, pivotable at 140 (Fig. 8).

Clutch C1 is a multiple disk clutch (Fig. 7) having disks 141 some attached to shaft 129 and some to shaft 124 and the disks are compressed by compression member 142 normally engaged by spring 143 to compress it against the disks, but retractable against spring 143 by sleeve 144 flanges 145, yoke lever 146, and piston 147 which under fluid pressure in cylinder 148 raises yoke lever 146 to disengage disks 141 and the associated shafts. The cylinder 148 may receive fluid or liquid under pressure from conduit 149 when valve 150 is turned to admit pressure of fluid from conduit 151. The same conduit 149 simultaneously delivers fluid under pressure to branch conduit 152 and thereby to cylinder 153 which pressure will thrust opposed pistons 154 in cylinder 153, apart to compress brake members 155 against braking drum 156 which is fixed on shaft 124, for the propeller braking function. The same conduit 149 simultaneously delivers fluid under pressure to branch conduit 157 and thereby to hydraulic converter unit A1 to hydraulically engage that unit. All these hydraulically engaged or disengaged units are placed in the opposite conditions when valve 150 is turned to opposite position by lever 158 to release fluid to discharge conduit 159, as fluid then discharges from cylinders 148 and 153 and also discharges from hydraulic converter unit A1 by means of discharge ports or vents 160. The latter are so small that they permit only slow discharge and therefore do not interfere with the operation of fluid under pressure for the opposite conditions.

The valve lever 158 is normally (for slow speed control) pulled by tension spring 161 acting on lever 162 (flexibly connected with lever 158) to place valve 150 in the position shown (that for slow speed), but levers 162, 158 may be pulled against spring 161 by solenoid 163 acting on armature 164a, when current is passed through solenoid 163 from contact 164, when latter is contacted by contact lever 165, and current passed by battery 96. Breaking of this contact 164, 165 is by spring 93 whenever electro-magnet 92 is denergized as when the vehicle speed is below the critical vehicle speed determined by speedometer means X and contact means 79, 80, 81, 82, the latter not being shown in this Figure 5, or associated figures, as it is shown in connection with the first form.

The conduit 151 may receive fluid as oil or liquid or air from tank 166, as compressed therein by pump 167 from supply pipe 168, safety valve 169 providing against excessive pressure. Conduit 151 also supplies fluid under pressure to branch conduit 170 for control of the blades of the contra-rotating propeller units D1 and D2. The fluid under pressure from conduit 170 may be caused to flow to either end of the cylinder 171 by conduits 172—173, and when there is flow to one end thereby there is flow or release of fluid from the other end through the other conduit, this flow being determined by the valve 174 as turned to either of its positions by hand lever 175, which may be remotely controlled by rod 176. In the position shown valve admits fluid under pressure to the rear end of cylinder 171 and thus has forced the piston therein to the forward end of cylinder 171 and fluid is released to release conduit 177 from the other end of cylinder 171. As piston 178 is forced forwardly it has pulled control rod 179 forwardly and the latter has pulled the pair of levers 180 and these have similarly pulled intermediate levers 181 and collar 182 and the pair of levers 183. Since levers 180 are pivotably connected to cranks 184 on blade shafts 185 and levers 181 are pivotably connected to cranks 184 at one end and collar 182 by race 182a and race 182b to levers 183, and the remote ends of levers 183 are connected to cranks 186 of shafts 187 of blades 71, all blades of both propeller means D1 and D2 are moved in unison to move them to the angle of incidence for vehicle forward propulsion or in the reverse direction to the angle of incidence for rearward propulsion. Only one blade of each propeller means is shown but blade shafts for the other opposite blade in each propeller means is shown mounted opposite to the blades shown, in the hub means. See Figure 9.

When the piston 178 is moved rearwardly by manually turning the valve 174 to its opposite position, fluid flows under pressure to the forward end of cylinder 171 and is released from the opposite end and this would result in moving the control rod 179 rearwardly and simultaneously pulling the levers and cranks of the blades rearwardly to change the angles of incidence of blades of both propeller means D1 and D2 to the opposite positions, that for the opposite propulsion. Thus positioning of the blades in either forward or rearward propulsion positions is simultaneous for both propeller means D1 and D2 and is accomplished by the driver of the vehicle by valve 174, and he may use this reversing means to accomplish rearward or forward propulsion by the propeller means in conjunction with his control of the low speed or road wheel propulsion by hand controlled lever 139. Likewise he may use the propeller means D1 and D2 for vehicle braking at any time by manipulation of valve 174, it being noted that in this form, when the engine throttle is closed to cease power output of the engine, if the vehicle is traveling forward at considerable speed, say over the critical speed, the propeller means would, in some cases be automatically reversed in direction of rotation, thereby automatically assuming braking condition, until the critical speed is reached, whereupon valve 150 is automatically moved to the low speed transmission position.

In this form, in the low speed transmission condition, drive from casing 19 to differential shaft 23 causes torque conversion through hydraulic converter unit A1 and this converter torque is transmitted to shaft 22 and is added to torque on shaft 22 directly from differential casing 19, for low speed driving of the vehicle. When critical speed is exceeded, valve 150 is automatically changed to cause drive to shaft 22 through converter A1 to be eliminated and simultaneously to cause clutching of the propeller means to shaft 23 for propulsion and at the same time the braking means for the propeller drive is disengaged.

While I have shown particular devices and combinations of devices in the illustration of my invention, other detailed devices and combinations of devices may be utilized in the realization without departing from the spirit and contemplation of the invention. And in realization of my invention devices and parts thereof will be proportioned as to each in the manner best suitable for the function of the part, some parts in the illustration being shown somewhat large in proportion to effect adequate illustration and understanding of such parts.

What I claim is:

1. In a vehicle propulsion means, a road wheel means and a wheel driving element in driving connection therewith, an air propeller means for propulsion and a propeller driving element in driving connection therewith, an engine and an engine shaft element driven thereby, power transmission mechanism for driving said wheel driving element and said propeller driving element, said mechanism including a gear rotatable in driving relation with one of said elements, a gear rotatable in driving relation with a second one of said elements, a satellite carrier rotating in fixed relation with the third of said elements, satellite gears borne by said carrier and meshing with both of said gears whereby the torque available on the engine shaft is divided between the said gears meshing with the satellite gears; a secondary transmission to transmit drive from the meshed gear, which is in driving relation with the air propeller means, to the road wheel means, this secondary transmission including an engageable or disengageable clutch means; and an engageable or disengageable clutch means interposed in the drive to the air propeller means from the said meshed gear in driving relation therewith.

2. In a vehicle propulsion means, an engine and torque shaft thereof, a satellite pinion carrier mounted to be rotatable and having engagement with said torque shaft to be driven thereby, a pair of transmission gears each mounted to be rotatable on axes coincidental with that of said carrier, freely rotatable satellite pinions supported on said satellite pinion carrier in location eccentrically of the axis of said carrier and having engagement on opposite sides with the respective members of said transmission gears, a road wheel means interconnected with one of said transmission gears to be driven thereby for effecting vehicle propulsion by road traction, a rotating air propeller means interconnected with the other of said transmission gears to be driven thereby for effecting vehicle propulsion by displacement of air; a secondary transmission to transmit drive from the last named transmission gear to the road wheel means this secondary transmission including an engageable or disengageable clutch means; and an engageable or disengageable clutch means interposed in the drive to the air propeller means from the said transmission gear interconnected therewith.

3. In a vehicle propulsion means, an engine, a rotatable work transmission unit receiving kinetic energy for its driving from said engine, a pair of rotatable elements each mounted to have rotation in bearing means, a torque transmitting means rotatably mounted in said work transmission unit in a location eccentrically of the axis of said work transmission unit, said torque transmitting means having driving inter-engagement on opposite sides of the axis with the respective members of said pair of rotatable elements to transmit drive from said work transmission unit to each of said pair of rotatable elements in accordance with the torque balance as applied through said torque transmitting means, a road wheel means inter-connected with one of said pair of rotatable elements to be driven thereby for propulsion, a rotatable air displacement means inter-connected with the other of said pair of rotatable elements to be driven thereby for propulsion by displacement of air; a secondary transmission to transmit drive from the one rotatable element, which is in driving inter-connection with the air displacement means, to the road wheel means, this secondary transmission having interposed therein an engageable or disengageable clutch means; and an engageable or disengageable clutch means interposed in the drive to the air displacement means.

4. All of the means described and claimed in claim 3 and in combination therewith, a control means to conjointly effect in one condition of operation, engagement of the said clutch means interposed in the said secondary transmission and disengagement of the said clutching means interposed in the drive to the air displacement means; and to conjointly effect in another condition of operation, disengagement of the said clutch means interposed in the said secondary transmission and engagement of the said clutching means interposed in the drive to the air displacement means.

5. In a vehicle propulsion means, a road wheel means and a wheel driving element in driving connection therewith, an air propeller means for propulsion and a propeller driving element in driving connection therewith, an engine and an engine shaft element driven thereby, power transmission mechanism for driving said wheel driving element and said propeller driving element, said mechanism including a gear rotatable in driving relation with one of said elements, a gear rotatable in driving relation with a second one of said elements, a satellite carrier rotatable in driving relation with the third of said elements, satellite gears borne by said carrier and meshing with both of said gears whereby the torque available on the engine shaft is divided between the said gears meshed with the rotatable gears; a secondary transmission to transmit drive from the gear, which is in driving relation with the air propeller means, to the road wheel means, this secondary transmission having interposed therein an engageable or disengageable clutch means and speed reducing means; and an engageable or disengageable clutch means interposed in the drive to the air propeller means.

6. In a vehicle propulsion means, an engine and torque shaft thereof, a satellite pinion carrier mounted to be rotatable and having engagement with said torque shaft to be driven thereby, a pair of transmission gears each mounted to be rotatable on axes coincidental with that of said carrier, freely rotatable satellite pinions supported on said satellite pinion carrier in location eccentrically of the axis of said carrier and having engagement on opposite sides with the respective members of said transmission gears, a road wheel means interconnected with one of said transmission gears to be driven thereby for effecting vehicle propulsion by road traction, a rotating air propeller means interconnected with the other of said transmission gears to be driven thereby for effecting vehicle propulsion by displacement of air; a secondary transmission to transmit drive from the one transmission gear, which is in driving inter-connection with the air propeller means, to the road wheel means, this secondary transmission having interposed therein an engageable or disengageable clutch means; an engageable or disengageable clutch means interposed in the drive to the air displacement means; and a control means to conjointly effect in one condition of operation, engagement of the said clutch means interposed in the said secondary transmission and disengagement of the said clutching means interposed in the drive to the air displacement means; and to conjointly effect in another condition of operation, disengagement of the said clutch means interposed in the said secondary transmission and engagement of the said clutching means interposed in the drive to the air displacement means.

7. All of the means described and claimed in claim 6 and in combination therewith vehicle speed measuring means arranged in combination with the said control means including means to effect the first named combination of clutch engagement and disengagement when the vehicle travel speed is less than a predetermined travel speed and to effect the alternate combination of clutch engagement and disengagement when the vehicle travel speed is above the said predetermined travel speed.

8. All of the means described and claimed in claim 6 and in combination therewith a braking means applicable to the said air propeller means for halting its rotation; and vehicle speed measuring means arranged in combination with the said control means including, means to conjointly effect the first named combination of clutch engagement and disengagement and application of the said braking means to said air propeller means when vehicle travel speed is less than a predetermined travel speed and to effect the second named combination of clutch engagement and disengagement and release of the said braking means from the said air propeller means when the vehicle travel speed is above the said predetermined travel speed.

9. In a vehicle propulsion means, an engine and torque shaft thereof, a satellite pinion carrier mounted to be rotatable and having engagement with said torque shaft to be driven thereby, a pair of transmission gears each mounted to be rotatable on axes coincidental with that of said carrier, freely rotatable satellite pinions supported on said satellite pinion carrier in location eccentrically of the axis of said carrier and having engagement on opposite sides with the respective members of said transmission gears, a propulsion means interconnected with one of said transmission gears to be driven thereby for effecting vehicle propulsion, another propulsion means interconnected with the other of said transmission gears to be driven thereby for effecting vehicle propulsion, a speed reducing torque increasing means and electromagnetically induced clutching means for engaging said speed reducing torque increasing means between said pair of transmission gears to transmit drive from one to the other at reduced speed transmission, electro-magnetically induced clutching means for engaging or disconnecting from one transmission gear to its associated propulsion means, and vehicle speed measuring means arranged in combination with said electro-magnetically induced clutching means to effect engagement of one said clutching means and disengagement of the other at vehicle speed below a predetermined speed and to effect the contra engagement and disengagement of said clutching means at vehicle speed above the predetermined vehicle speed.

10. All of the means as described and as claimed in claim 2 and in combination; vehicle speed measuring means in operative coordination with the road wheel means to effect; in the condition, when travel speed is less than a predetermined travel speed, engagement of the clutching means in the secondary transmission and disengagement of the clutching means in the drive to the air propeller means; and to effect in the condition, when travel speed is more than the predetermined travel speed, disengagement of the clutching means in the secondary transmission and engagement of the clutching means in the drive to the air propeller means.

11. All of the means as described and as claimed in claim 2 and in combination; a braking means applicable to the air propeller means to halt its rotation; vehicle speed measuring means in operative coordination with the road wheel means to effect in the condition, when travel speed is less than a predetermined travel speed, engagement of the clutching means in the secondary transmission, disengagement of the clutching means in the drive to the air propeller means and application of the braking means to the air propeller means; and to effect in the condition, when travel speed is over the predetermined travel speed, disengagement of the clutching means in the secondary transmission, release of the braking means on the air propeller means and engagement of the clutching means in the drive to the air propeller means.

12. All of the means as described and as claimed in claim 2 and in combination; means to reverse the angles of incidence of the air propeller means for opposite propulsive effect in rotation; and a control means to effect engagement of the clutching means in the secondary transmission and to maintain engagement of the clutching means in the drive to the air propeller means and to actuate co-incidentally said means to reverse the angles of incidence of the air propeller means whereby to effect vehicle braking.

13. All of the means as described and as claimed in claim 2 and in combination: each of the said clutching means being electro-magnetically induced clutching means; vehicle speed measuring means in operative coordination with the road wheel means to effect; in the condition, when travel speed is less than a predetermined travel speed, electromagnetic excitation of the clutching means in the secondary transmission and de-excitation electro-magnetically of the clutching means in the drive to the air propeller means; and to effect in the condition, when vehicle travel speed is over the predetermined travel speed, de-excitation of the clutching means in the secondary transmission, and excitation electro-magnetically of the clutching means in the drive to the air propeller means.

14. All of the means as described and as claimed in claim 2 and in combination: a braking means applicable to the air propeller means to halt its rotation, this braking means including an electro-magnetic actuator; vehicle speed measuring means in operative coordination with the road wheel means to effect; in the condition, when travel speed is less than a predetermined travel speed, electro-magnetic excitation of the clutching means in the secondary transmission and de-excitation of the clutching means in the drive to the air propeller means and excitation of the electro-magnetic actuator in the braking means to the air propeller means; and to effect in the condition, when vehicle travel speed is over the predetermined travel speed, de-excitation of the clutching means in the secondary transmission, excitation of the electro-magnetic clutching means in the drive to the air propeller means, de-excitation of the braking means; each of the said clutching means being electro-magnetically induced clutching means.

15. All of the means as described and as claimed in claim 2 and in combination: the said clutching means in said secondary transmission including hydro-dynamical clutching means; the said clutching means in the drive to the air propeller means including hydrodynamical actuation means; vehicle speed measuring means in operative coordination with the road wheel means to effect in the condition, when travel speed is less than the predetermined travel speed, actuation of each of the hydrodynamical means to effect engagement of the said secondary transmission in the drive and disengagement of the said drive to the air propeller means; and to effect, in the condition, when vehicle travel speed is over the predetermined travel speed, the opposite actuation of the hydrodynamical means to effect disengagement of the said secondary transmission in the drive and engagement of the said drive to the air propeller means.

16. All of the means as described and as claimed in claim 2 and in combination: each of the said clutching means being electro-magnetically induced clutching means; vehicle speed measuring means in operative coordination with the road wheel means and including circuit closing means in circuit with a relay means and circuit closing means operative by the relay means to effect in the condition, when travel speed is less than a predetermined travel speed, electro-magnetic excitation of the clutching means in the secondary transmission and de-excitation electromagnetically of the clutching means in the drive to the air propeller means; and to effect in the condition, when vehicle travel speed is over the predetermined travel speed, de-excitation of the clutching means in the secondary transmission, and excitation electro-magnetically of the clutching means in the drive to the air propeller means.

References Cited in the file of this patent
UNITED STATES PATENTS

| | | |
|---|---|---|
| 1,044,945 | Tampier | Nov. 19, 1912 |
| 2,554,590 | Peterson | May 29, 1951 |

FOREIGN PATENTS

| | | |
|---|---|---|
| 476,152 | Great Britain | Dec. 2, 1937 |
| 561,432 | France | Oct. 22, 1923 |